US009239336B2

(12) United States Patent
Ellison et al.

(10) Patent No.: US 9,239,336 B2
(45) Date of Patent: Jan. 19, 2016

(54) METHOD AND APPARATUS FOR CLEARING A BLOCKAGE IN A PITOT OR STATIC PRESSURE LINE OF A DUCT OF A PRESSURE SENSOR

(75) Inventors: William Frank Ellison, Lytham St Anne's (GB); Clive Edwin Ceney, Penwortham (GB)

(73) Assignee: BAE SYSTEMS PLC, London (GB)

( * ) Notice: Subject to any disclaimer, the term of this patent is extended or adjusted under 35 U.S.C. 154(b) by 154 days.

(21) Appl. No.: 14/119,833

(22) PCT Filed: May 15, 2012

(86) PCT No.: PCT/GB2012/051079

§ 371 (c)(1), (2), (4) Date: Nov. 22, 2013

(87) PCT Pub. No.: WO2012/160349

PCT Pub. Date: Nov. 29, 2012

(65) Prior Publication Data

US 2014/0096618 A1 Apr. 10, 2014

(30) Foreign Application Priority Data

May 23, 2011 (EP) .................................... 11275086
May 23, 2011 (GB) .................................. 1108548.7

(51) Int. Cl.

| | |
|---|---|
| ***G01P 5/16*** | (2006.01) |
| ***G01P 3/62*** | (2006.01) |
| ***G01P 5/14*** | (2006.01) |
| ***G01P 13/02*** | (2006.01) |
| ***G01L 19/06*** | (2006.01) |
| ***B08B 5/04*** | (2006.01) |
| ***B23P 11/00*** | (2006.01) |

(52) U.S. Cl.

CPC ... *G01P 5/16* (2013.01); *B08B 5/04* (2013.01); *B23P 11/00* (2013.01); *G01L 19/0627* (2013.01); *G01P 3/62* (2013.01); *G01P 5/14* (2013.01);

(Continued)

(58) Field of Classification Search

None

See application file for complete search history.

(56) References Cited

U.S. PATENT DOCUMENTS 1,693,941 A 12/1928 Schuster
5,991,939 A * 11/1999 Mulvey ......................... 137/526

(Continued)

FOREIGN PATENT DOCUMENTS

| | | | |
|---|---|---|---|
| CN | 201 765 248 | U | 3/2011 |
| GB | 323524 | A | 1/1930 |
| GB | 2 418 739 | A | 4/2006 |

OTHER PUBLICATIONS

International Search Report (PCT/ISA/210) mailed on Aug. 24, 2012, by the European Patent Office as the International Searching Authority for International Application No. PCT/GB2012/051079.

(Continued)

*Primary Examiner* — Harshad R Patel

(74) *Attorney, Agent, or Firm* — Maine Cernota & Rardin

(57) ABSTRACT

Apparatus and method for providing the apparatus, the apparatus including: a duct; and a non-return valve; wherein the duct has a first portion and a second portion; the first portion has a first end and a second end; the first end is open to a fluid (e.g. air); the second end is connected to the second portion such that fluid is permitted to flow between the first portion and the second portion; the non-return valve is positioned at or proximate to the second end; and the non-return valve is arranged such that, upon application of a suction force to the first portion at the first end, fluid flows into the first portion via the non-return valve from outside the duct, and through the first portion from the second end to the first end.

11 Claims, 3 Drawing Sheets

(52) U.S. Cl.
CPC ......... *G01P 13/025* (2013.01); *Y10T 29/49826* (2015.01)

(56) References Cited

U.S. PATENT DOCUMENTS

2004/0206854 A1 10/2004 Shah et al.
2007/0267546 A1 11/2007 Shah et al.
2009/0321576 A1 12/2009 Shah et al.
2011/0214758 A1* 9/2011 Spitzer .......................... 137/511
2013/0213607 A1* 8/2013 Miyamoto et al. ............ 137/511

OTHER PUBLICATIONS

European Search Report for EP 11275086 dated Nov. 8, 2011.
United Kingdom Search Repor for GB 1108548.7 dated Jun. 8, 2011.

* cited by examiner

METHOD AND APPARATUS FOR CLEARING A BLOCKAGE IN A PITOT OR STATIC PRESSURE LINE OF A DUCT OF A PRESSURE SENSOR

FIELD OF THE INVENTION

The present invention relates to ducts.

BACKGROUND

An aircraft's air data system measures outside air pressure to provide, for example, airspeed and altitude data to cockpit instruments.

Typically, air data systems use pressure sensors comprising forward (pitot) and side-facing (static) orifices on the surface of the aircraft. These orifices are linked to cockpit gauges, or pressure transducers, via small-diameter pneumatic tubing.

This tubing may become blocked with water or debris. Such blockages are particularly problematical (for example, blockages may result in erroneous cockpit indications) and have resulted in, or been suspected as causing, aircraft losses.

Conventionally, to avoid or alleviate a problem of tube blockages, tubing runs are designed to provide positive drainage of water or otherwise designed to be least affected by moisture or other foreign matter. Also, 'drain traps' may be installed at the lowest points in the pitot-static lines to permit the removal of collected water.

Protective 'Remove Before Flight' covers are normally fitted over an aircraft's pitot-static sensors, when the aircraft is on the ground, to prevent water, solid debris, or insects, from blocking the orifices or tubing.

However, if tube blockages do occur, or are suspected, the pitot-static system pneumatic lines may have to be dismantled to permit cleaning. This tube cleaning could be performed by blowing, suction, flushing out with a fluid, or the insertion of a probe.

This dismantling and cleaning process may be time-consuming. Also, it may be required that, once re-assembled, the pitot-static system must be tested for air leaks.

SUMMARY OF THE INVENTION

In a first aspect, the present invention provides apparatus comprising a duct and a non-return valve, wherein the duct comprises a first portion and a second portion, the first portion has a first end and a second end, the first end is open to a fluid, the second end is connected to the second portion such that fluid is permitted to flow between the first portion and the second portion, the non-return valve is positioned at or proximate to the second end, and the non-return valve is arranged such that, upon application of a suction force to the first portion at the first end, fluid flows into the first portion via the non-return valve from outside the duct, and through the first portion from the second end to the first end.

The second portion may have a third end and a fourth end, the second end may be connected to the third end, the fourth end may be connected to a device, and upon application of a suction force to the first portion at the first end, the non-return valve may act to reduce an effect of the suction force on the device.

The device may be a pressure transducer.

The second portion may have a fifth end, and the non-return valve may be positioned at the fifth end.

The apparatus may further comprise a filter, the filter being connected to an inlet of the non-return valve such that fluid allowed to flow into the duct by the non-return valve is filtered by the filter.

The duct may comprise a pitot pressure line or static pressure line of a pitot-static system.

The first portion may comprise a length of flexible tubing.

At least part of the first portion may have an internal diameter of less than 5 mm.

The fluid may be air.

In a further aspect, the present invention provides an aircraft comprising the apparatus according to the above aspect.

The aircraft may be an unmanned aircraft.

The apparatus may be housed in, mounted on, or integrated in a wing of the aircraft such that the first end is substantially flush with a surface of the wing.

A crack pressure of the non-return valve may be greater than a maximum pressure differential across the non-return valve experienced by the non-return valve whilst the aircraft is in-flight.

In a further aspect, the present invention provides a method for clearing a blockage in the first portion of the apparatus according to any of the above aspects, the method comprising applying a suction force to the first portion at the first end.

In a further aspect, the present invention provides a method of providing apparatus, the method comprising providing a duct, and providing a non-return valve, wherein the duct comprises a first portion and a second portion, the first portion has a first end and a second end, the first end is open to a fluid, the second end is connected to the second portion such that fluid is permitted to flow between the first portion and the second portion, the non-return valve is positioned at or proximate to the second end, and the non-return valve is arranged such that, upon application of a suction force to the first portion at the first end, fluid flows into the first portion via the non-return valve and through the first portion from the second end to the first end.

DETAILED DESCRIPTION

Figure 1:
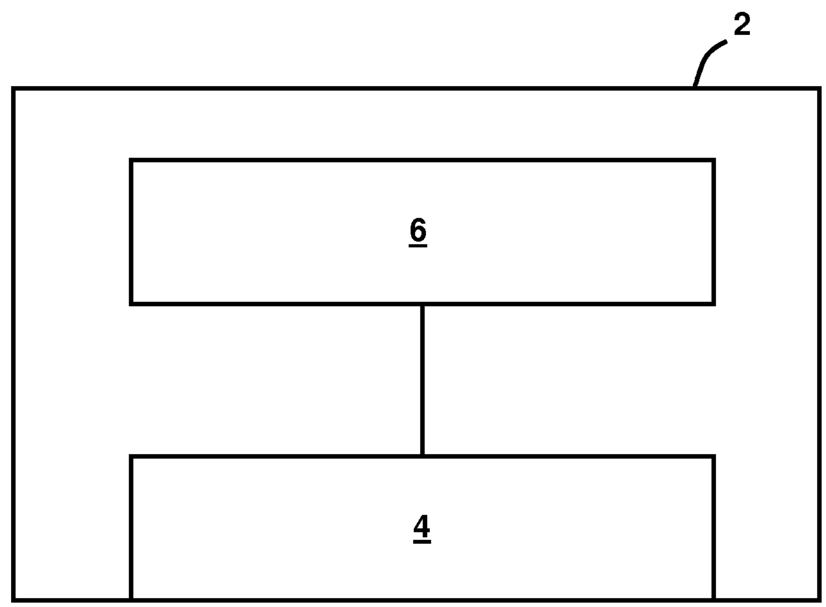
FIG. 1 is a schematic illustration (not to scale) of an example of an aircraft in which an embodiment of an air pressure sensor is implemented.

FIG. 1 is a schematic illustration (not to scale) of an example of an aircraft 2 in which an embodiment of an air pressure sensor is implemented.

In this embodiment the aircraft 2 is an unmanned air vehicle (UAV).

In this embodiment, the aircraft 2 comprises a pitot-static system 4 and a processor 6.

The pitot-static system is described in more detail later below with reference to FIGS. 2 and 3.

In this embodiment, the pitot-static system 4 is connected to the processor 6 such that, in operation, air pressure measurements made by the pitot-static system 4 are sent from the pitot-static system 4 to the processor 6. In this embodiment, these air pressure measurements may be sent to the processor 6 as either analogue electrical or digital signals. In other embodiments, measurements are received at the processor 6 as pneumatic pressures.

In this embodiment, the processor 6 uses the air pressure measurements received from the pitot-static system 4 to determine, for example, the airspeed, Mach number, pressure altitude and/or vertical speed of the aircraft 2.

Figure 2:
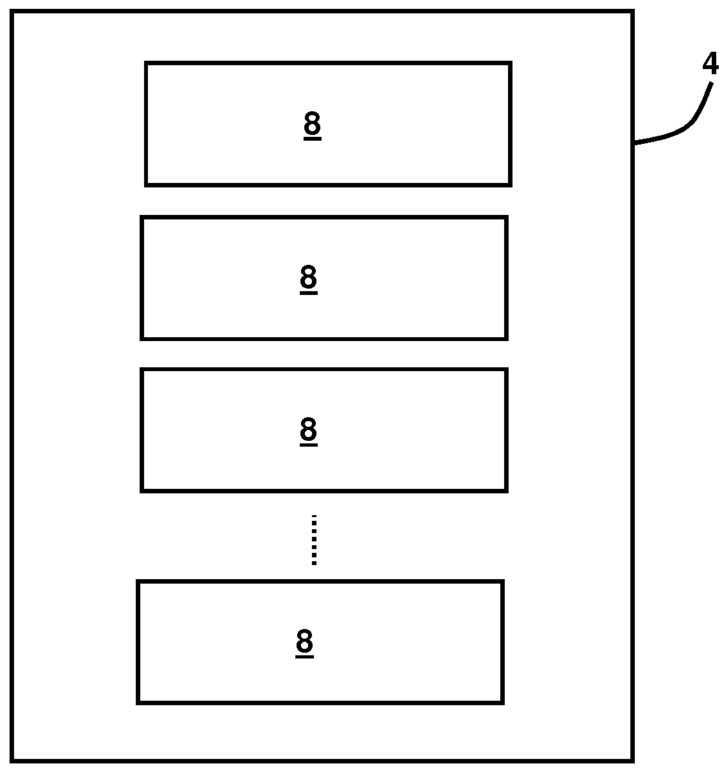
FIG. 2 is a schematic illustration (not to scale) of a pitot-static system on the aircraft.

FIG. 2 is a schematic illustration (not to scale) of the pitot-static system 4.

In this embodiment, the pitot-static system 4 comprises a plurality of air pressure sensors 8. In this embodiment, each of the pressure sensors 8 are substantially the same (though positioned differently on the aircraft). A pressure sensor 8 is described in more detail later below with reference to FIG. 3.

In this embodiment, each pressure sensor 8 is located at a different position on the aircraft 2. This tends to provide that the air pressure at different points on the aircraft 2 is measured. Furthermore, in this embodiment, air pressure measurements taken by one or more of the pressure sensors 8 are used by the processor 6 to determine, for example, the airspeed, Mach number, altitude, and/or altitude trend of the aircraft 2.

Figure 3:
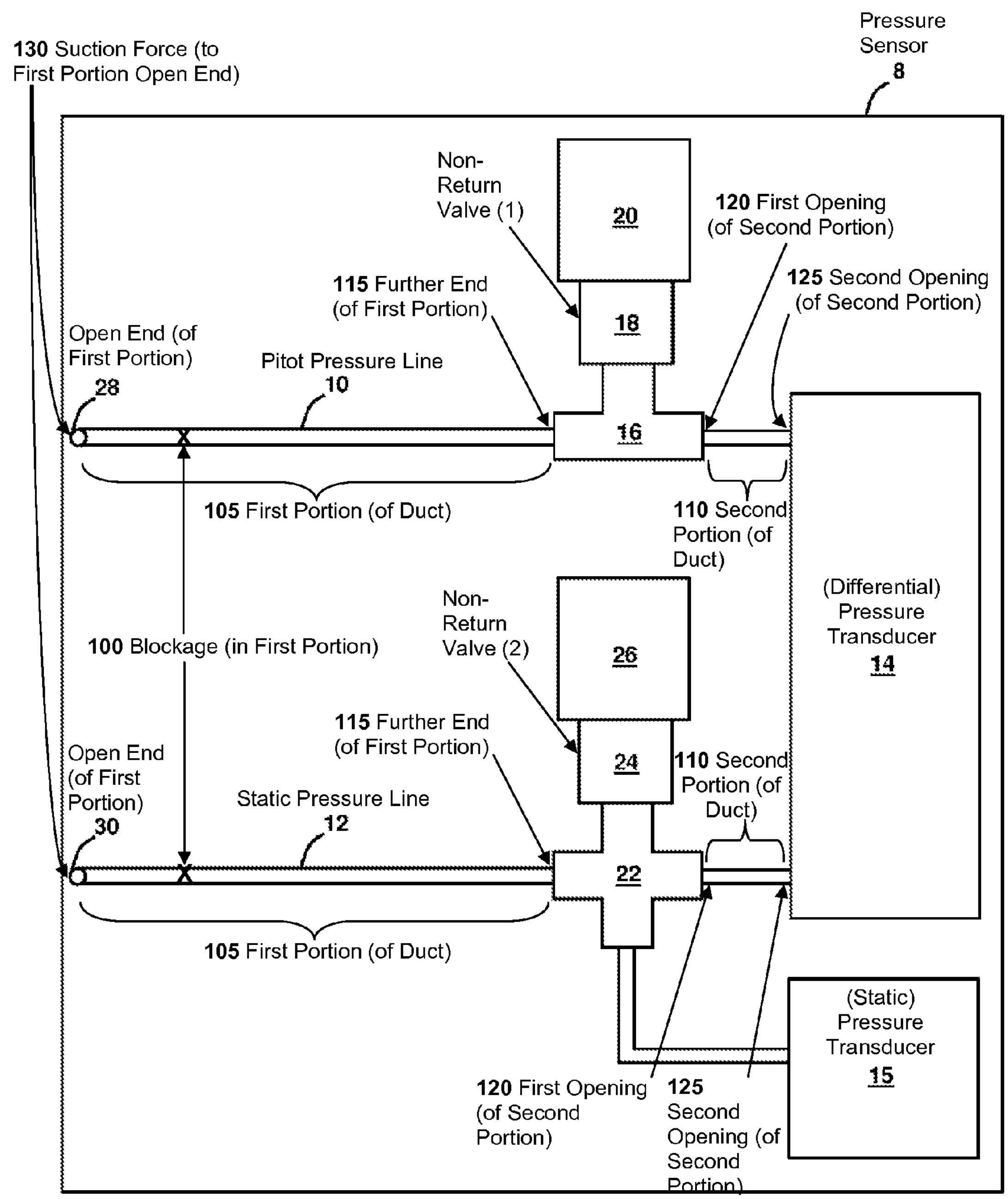
FIG. 3 is a schematic illustration (not to scale) of an embodiment of pressure sensor of the pitot-static system.

FIG. 3 is a schematic illustration (not to scale) of a pressure sensor 8.

In this embodiment, the pressure sensor 8 comprises a pitot pressure line 10, a static pressure line 12, a differential pressure transducer 14, a static pressure transducer 15, a T-piece 16, a first non-return valve 18, a first filter 20, an X-connector 22, a second non-return valve 24, and a second filter 26.

In this embodiment, the pitot pressure line 10 is a length of relatively small-diameter, flexible, pneumatic tubing. In this embodiment, the pitot pressure line 10 has an internal diameter of less than 5 mm.

The pitot pressure line 10 has an open end (which is hereinafter referred to as the "pitot head" and is indicated in FIG. 3 by the reference numeral 28) and a further end, opposite to the pitot head 28. This further end of the pitot pressure line 10 is connected to a first opening of the T piece 16.

In this embodiment, the T-piece 16 is conventional T-piece tube, or T-connector (i.e. a pipe in the shape of a 'T' with openings at each of the three arms of the 'T'). The T-piece 16 comprises a first opening, a second opening, and a third opening.

In this embodiment, the first opening of the T-piece 16 is opposite to the second opening of the T-piece 16. The first and second openings of the T-piece 16 are connected by a substantially straight piece of tubing.

In this embodiment, the third opening of the T-piece 16 is an opening at an end of an arm of the T-piece 16 that is substantially perpendicular to the substantially straight piece of tubing connecting the first and second openings of the T-piece 16. The end of the perpendicular arm opposite to the third opening of the T-piece 16 is connected to the substantially straight piece of tubing that connects the first and second ends of the T-piece 16.

In this embodiment, the first opening of the T-piece 16 is connected to an end of the pitot pressure line 10 that is opposite to the pitot head 28.

Also, the second opening of the T-piece 16 is connected to the differential pressure transducer 14. In this embodiment, the differential pressure transducer 14 converts measurements of analogue pressure differences between the pitot pressure line 10/the T-piece 16 and the static line 12/the X-connector 22, to either analogue or digital electrical signals.

In other embodiments, the second opening of the T-piece 16 is connected to one or more different appropriate entities instead of or in addition to the differential transducer 14, e.g. pneumatically-actuated cockpit instruments.

Also, the third opening of the T-piece 16 is connected to the first non-return valve 18.

The first non-return valve 18 is a conventional non-return valve. The first non-return valve is positioned between the third opening of the T-piece 16 and the first filter 20.

In this embodiment, the first non-return valve 18 is arranged such that it substantially prevents or opposes air travelling in a direction from the T-piece 16 to the first filter 20.

Also, in this embodiment the first non-return valve 18 is arranged such that it permits air to travel in a direction from the first filter 20 to the T-piece 16. In this embodiment, air is permitted to travel from the first filter 20 into the T-piece 16 if a pressure differential across the first non-return valve 18 (i.e. a difference between a relatively high air pressure at the first filter 20 side of the first non-return valve 18, and a relatively low air pressure at the T-piece 16 side of the first non-return valve 18) is above a certain threshold value (i.e. a crack pressure of the first non-return valve).

In this embodiment, the first filter 20 is an air filter that filters out dust, debris etc. from air being drawn through the first filter 20 into the T-piece 16 via the first non-return valve 18 (as described in more detail later below).

In this embodiment, the static pressure line 12 is a length of relatively small-diameter, flexible, pneumatic tubing. In this embodiment, the static pressure line 12 has an internal diameter of less than 5 mm.

The static pressure line 12 has an open end (which is hereinafter referred to as the "static port" and is indicated in FIG. 3 by the reference numeral 30) and a further end, opposite to the static port 30. This further end of the static pressure line 12 is connected to a first opening of the X-connector 22.

In this embodiment, the X-connector 22 is a conventional X-piece tube, or X-connector (i.e. a pipe in the shape of a 'X' with openings at each of the four arms of the 'X'). The X-connector 22 comprises a first opening, a second opening, a third opening, and a fourth opening.

In this embodiment, the first opening of the X-connector 22 is opposite to the second opening of the X-connector 22. The first and second openings of the X-connector 22 are connected by a substantially straight piece of tubing.

In this embodiment, the third and fourth openings of the X-connector 22 are opposite openings at the ends of two arms of the X-connector 22 that are both substantially perpendicular to the substantially straight piece of tubing connecting the first and second openings of the X-connector 22. The ends of these perpendicular arms that are opposite to the third and fourth openings of the X-connector 22 are connected to the substantially straight piece of tubing that connects the first and second ends of the second X-connector 22.

In this embodiment, the first opening of the X-connector 22 is connected to an end of the static pressure line 12 that is opposite to the static port 30.

Also, the second opening of the X-connector 22 is connected to the differential pressure transducer 14. The third opening of the X-connector 22 is connected to the static pressure transducer 15. In this embodiment, the differential pressure transducer 14, and the static pressure transducer 15, convert measurements of analogue pressures within the static pressure line 12 and X-connector 22 to either analogue or digital electrical signals.

In other embodiments, the second and third openings of the X-connector 22 are connected to one or more different appropriate entities instead of or in addition to the differential transducer 14 and/or the static pressure transducer 15, e.g. pneumatically-actuated cockpit instruments.

Also, the fourth opening of the X-connector 22 is connected to the second non-return valve 24.

The second non-return valve 24 is a conventional non-return valve. The second non-return valve 24 is positioned between the fourth opening of the X-connector 22 and the second filter 26.

In this embodiment, the second non-return valve 24 is arranged such that it substantially prevents or opposes air travelling in a direction from the X-connector 22 to the second filter 26.

Also, in this embodiment the second non-return valve 24 is arranged such that it permits air to travel in a direction from the second filter 26 to the X-connector 22. In this embodiment, air is permitted to travel from the second filter 26 into the X-connector 22 if a pressure differential across the second non-return valve 24 (i.e. a difference between a relatively high air pressure at the second filter 26 side of the second non-return valve 24, and a relatively low air pressure at the X-connector 22 side of the second non-return valve 24) is above a certain threshold value (i.e. a crack pressure of the second non-return valve 24).

In this embodiment, the second filter 26 is an air filter that filters out dust, debris etc. from air being drawn through the second filter 26 into the X-connector 22 via the second non-return valve 24 (as described in more detail later below).

In this embodiment, the pitot pressure line 10 is positioned on the aircraft 2 in such a way that the pitot head 28 is located on a wing or front section of the aircraft 2. The pitot head 28 is substantially flush with the surface of the aircraft wing or front section. Furthermore, the pitot head 28 is facing forward. Thus, in this embodiment, the pitot head 28 is exposed to the relative wind caused by the movement of the aircraft 2 through the air.

In this embodiment, the static pressure line 12 is positioned on the aircraft 2 in such a way that the static port 30 where the air flow is relatively undisturbed by the movement of the aircraft 2. The static port 30 is substantially flush with an outer surface of the fuselage of the aircraft 2.

In operation, as the aircraft 2 moves through the air, air travels into the pitot pressure line 10 via the pitot head 28, thereby raising the pressure of air inside the pitot pressure line 10.

In this embodiment, the first non-return valve is arranged such that the flow of air from the pitot pressure line 10 and T-piece 16 to the first filter 20 is substantially prevented or opposed.

The air pressure in the pitot pressure line 10 (and the T-piece 16) tends increase proportionally to the square of the airspeed of the aircraft 2. Also, the air pressure in the static pressure line 12 (and the X-connector 22) tends not increase proportionally to the airspeed of the aircraft 2.

In operation, an electrical signal indicative of a pressure differential between the pitot pressure line 10 and the static pressure line 12 (called the "impact pressure") is produced by the differential pressure transducer 14 and sent to the processor 6.

Also in operation, an electrical signal indicative of the pressure in the static pressure line 12 (called the "static pressure") is produced by the static pressure transducer 15 and sent to the processor 6.

In operation, measurements of the impact and static pressures produced by the differential pressure transducer 14 and the static pressure transducer 15 respectively are sent from the respective transducers 14, 15 to the processor 6 (not shown in FIG. 3). These readings are then used by the processor 6 to determine, for example, the airspeed, Mach number, altitude, and/or altitude trend of the aircraft 2 in a conventional way.

The flexible tubes of the pitot-static system 4 may become blocked. For example, the tubes may be blocked by water or debris arising from on-ground conditions. Also, the tubes may be blocked by in-air conditions e.g. rain ingress, insects, dust, volcanic ash etc.

Figure 4:
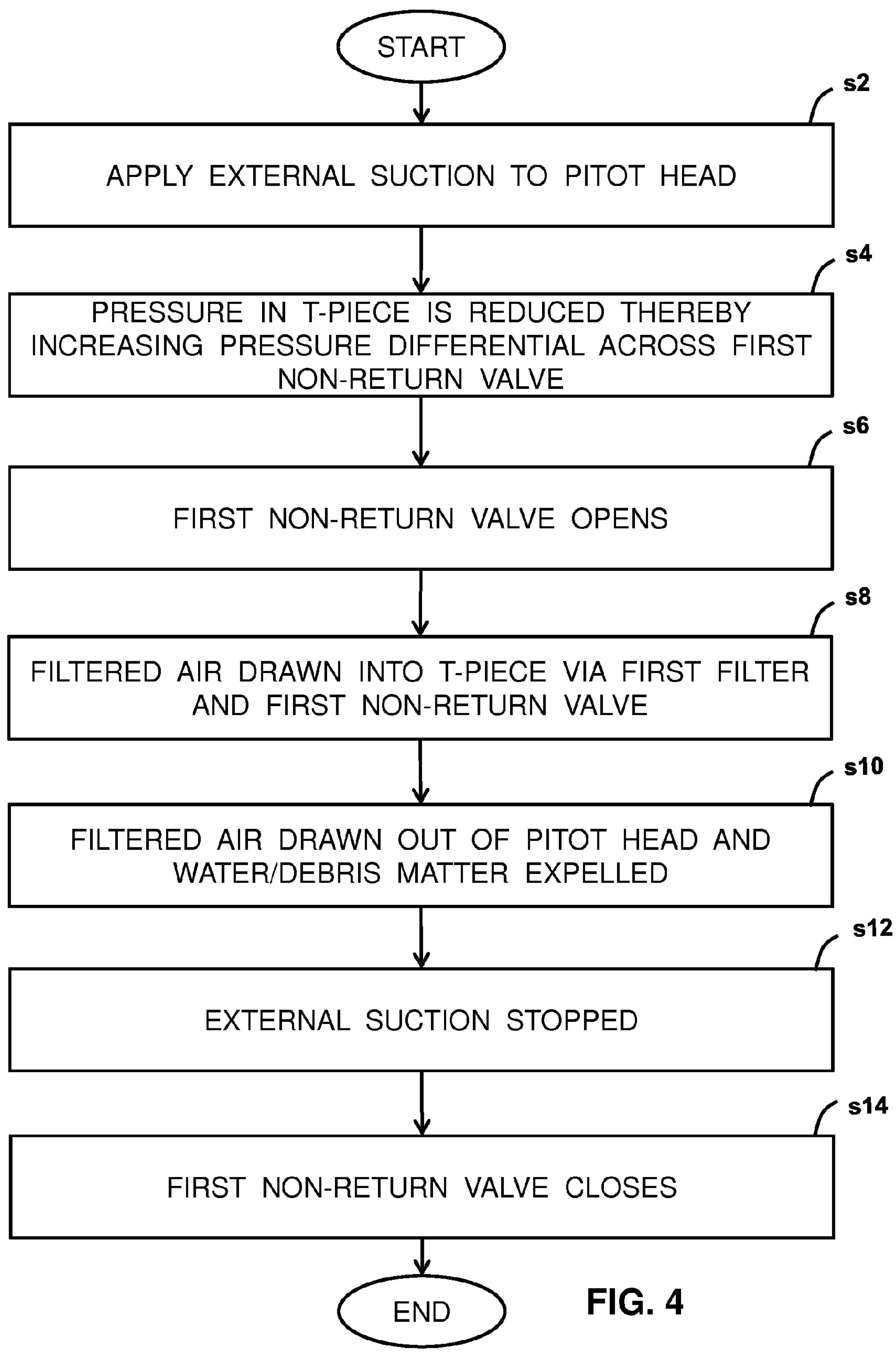
FIG. 4 is a process flowchart showing certain steps of an embodiment of a method of cleaning a pitot tube of the pressure sensor.

FIG. 4 is a process flowchart showing certain steps of an embodiment of a method of cleaning the pitot pressure line 10 of the pressure sensor 8 described above with reference to FIG. 3. The same method can be applied to the static pressure line 12 of the pressure sensor 8 to clean that tube.

In this embodiment, the method of FIG. 4 is performed whilst the aircraft 2 is on the ground, i.e. before or after take-off.

At step s2, suction is applied to the pitot head 28. This reduces the pressure inside the pitot pressure line 10.

At step s4, the reduction in pressure in the pitot pressure line 10 causes the pressure in the T-piece 16 to reduce.

In this embodiment, the reduction in pressure in the T-piece 16 is such that the pressure differential across the first non-return valve 18 (i.e. the difference in pressure between the air in the T-piece 16 and the air in the first filter 20) is greater than the crack pressure of the first non-return valve 18.

At step s6, the first non-return valve 18 opens such that air is permitted to flow in the direction from the first filter 20 to the T-piece 16. In this embodiment, the first non-return valve 18 remains open while an adequate differential pressure is maintained.

At step s8, air is drawn into the T-piece 16 via the first filter 20 and the (open) first non-return valve 18. This air being drawn into the T-piece 16 has been filtered by the first filter 20 and, thus, tends to be substantially free of water/dust/debris etc.

At step s10, the filtered air drawn in to the T-piece 16 is sucked out of the pitot pressure line 10 at the pitot head 28. Any water, dust, debris etc present in the pitot pressure line 10 tends to be sucked out of the pitot pressure line 10 as well. Thus, the pitot tube is cleaned.

At step s12, once no more water, dust, debris etc is being drawn out of the pitot pressure line 10 by the applied suction, the suction is stopped.

Thus, the pressure within the pitot pressure line 10 tends to increase such that the pressure differential across the first no-return valve 18 is below the crack pressure of the first non-return valve 18.

At step s14, the first non-return valve closes 18. Thus, the pressure sensor is substantially free of water, debris etc. and ready for use.

Thus, a method of cleaning the pitot pressure line 10 of the pressure sensor 8 is provided.

In this embodiment, the pitot pressure line 10 and the T-piece 16 in effect provide a duct, or conduit, for the air. Air forced into the pitot head 28 increases the air pressure in this duct. Also, an action of opening the first non-return valve 18 permits air to flow through this duct, from the third opening of the T-piece 16 to the pitot head 28.

The duct provided by the pitot pressure line 10 and the T-piece 16 may be conveniently thought of as having two ends—an open end (the pitot head 28) and a closed end (the second opening of the T-piece 16, which is closed by virtue of it being connected to the differential pressure transducer 14). The duct provided by the pitot pressure line 10 and the T-piece 16 also has a further opening (through the "wall" of the duct) provided by the first non-return valve 18.

Similarly, in this embodiment, the static pressure line 12 and the X-connector 22 in effect provide a duct, or conduit, for the air. An action of opening the second non-return valve 24 permits air to flow through this duct, from the fourth opening of the X-connector 22 to the static port 30.

Also, the duct provided by the static pressure line 12 and the X-connector 22 may be conveniently thought of as having two ends—an open end (the static port 30) and a closed end (the second and third openings of the X-connector 22, which are closed by virtue of them being connected to the differential pressure transducer 14 and static pressure transducer 15 respectively). Also, the duct provided by the static pressure line 12 and the X-connector 22 has a further opening (through a "wall" of the duct) provided by the second non-return valve 24.

An advantage provided by the above described pressure sensor and method is that blockages in small-diameter tubes may be removed (by the application of external suction). The method tends to be particularly useful for installations in which access to both ends of the affected tubing is impractical or impossible, or where equipment attached to a tube end (e.g. a pressure transducer or other sensor) may be damaged by other methods for clearing blockages.

A further advantage of the above described apparatus and method is that the unblocking of tubes tends to be possible without performing disassembly of the system. This reduces maintenance time and reduces or eliminates a risk of incorrect re-assembly.

In this embodiment, the length of tubing that is cleared by the above described method (i.e. by the application of external suction to the open end of the tube) is the length of tube between the T-piece or X-connector, positioned along that tube and the open end of that tube. In this embodiment, a T-piece, or X-connector, is connected between the pressure transducer and a piece of tubing. In other words, in this embodiment a T-piece, or X-connector non-return valve and filter assembly is positioned as far as possible along the length of a tube away from the respective open end of that tube. This tends to provide that the proportion of the tube that can be cleared of a blockage by the above described method is substantially as large as possible.

In this embodiment, a non-return valve is designed to remain closed if the pressure differential across it is below a certain threshold. Preferably, this pressure threshold is higher than an expected pressure differential between the open end of the tube and the filter inlet of the non-return valve in normal operating conditions. Thus, leakage of air/fluid into the tubing from the non-return valve advantageously tends to be substantially prevented in normal operation (i.e. when the tube clearing system is 'passive').

A further advantage provided by the above described system and method is that a non-return valve remains open while an adequate differential pressure is maintained across it (i.e. by the application of external suction to the open end of the relevant tube). This tends to permit a continuous air flow through the relevant tube which can be maintained until any and all blocking matter is forced out of the open end of the tube.

Air drawn into the inlet of a non-return valve is filtered. This advantageously tends to prevent further debris being drawn into the tube, or possibly being trapped inside the non-return valve and preventing it from closing properly.

A further advantage provided by the above described apparatus is that it tends to be possible to install retroactively an assembly comprising a T-piece or X-connector, a non-return valve, and a filter onto existing conventional pitot-static systems relatively easily. These systems can then be cleared according to the method described above with reference to FIG. 4.

The use of multiple pressure sensors on the aircraft advantageously provides sensor redundancy. The above described method may reduce the risk of these sensors becoming blocked by condensed water, insect matter, and or other debris. This is because the tubes of the sensors can be cleared, or purged, on the ground. This tends to increase the reliability of sensor reading from the pressure sensors. Furthermore, this increased sensor reliability tends to prevent a triplex data system becoming a duplex system, a quadruplex data system becoming a triplex system, and so on.

A further advantage provided by the above described system and method is that, depending on the type and the performance of a pressure transducer, it may be possible to protect that transducer from over-pressure when the tubes connected to it are being cleared (i.e. when external suction is being applied to the open end of a tube). For example, the static pressure transducer should not to be affected by the application of external suction at the static port. Also, the differential pressure transducer should not to be affected by the application of substantially equal external suction applied at both the pitot head and static port simultaneously.

Furthermore, when the tubes are being cleared, the pressure transducer tends to be advantageously protected from contamination from the debris matter/water ejected from the open end of the tube.

A further advantage provided by the above described apparatus and method is that, when the tube clearing method is not being applied (i.e. when the aircraft is flying and the air pressure is being measured by the pressure sensor), the flow path of air through the tube tends not to be changed or obstructed by the presence of the T-piece or X-connector, non-return valve, and filter assembly. Furthermore, the internal volume of the tube tends not to be changed by the presence of the T-piece or X-connector, non-return valve, and filter assembly. Furthermore, the air pressure in the tube between the open end and the pressure transducer tends not to be changed by the presence of the T-piece or X-connector, non-return valve, and filter assembly.

A further advantage provided by the above described apparatus and method is that a single passive purge system failure tends only to result in the loss of one pitot-static source. Other redundant pitot-static sources are unaffected by the failure.

A further advantage provided by the above described system and method is that the tube clearing/purging process (described above with reference to FIG. 4) may be performed without opening the aircraft access panels. Thus, it tends to be possible to clear tube blockages when access to the avionics bays is not permitted or possible without disassembling the pitot-static system or removing other aircraft systems/components to gain access to the pitot-static system. Therefore, a failure of, e.g. one non-return valve, should only affect pressure measurements by one pressure transducer and hence one of the multiple independent air data sources.

The non-return valves tend to advantageously provide that air flow from the tubes is substantially prevented from entering avionics bays of the aircraft. Furthermore, a sufficiently high crack pressure for a non-return valve tends to ensure that the non-return valve will not open as a result of pressure differences generated in flight.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the pressure sensor is implemented on an aircraft. The aircraft is an unmanned aircraft. However, in other embodiments the sensor is implemented on a different type of entity, for example a different type of vehicle (e.g. a manned aircraft, a land-based vehicle, or a water-based vehicle).

In the above embodiments, the pressure sensor is part of a pitot-static system and is used for measuring air pressure (to determine airspeed of the aircraft etc.). However, in other embodiments the pressure sensor is a device used for a different purpose. Thus, in other embodiments the pressure transducer is replaced with a different appropriate device. For example, in other embodiments the device is a pressure sensor used to measure the pressure of a different fluid, e.g. water. In other embodiments, the tube-clearing apparatus and method is implemented in a different tube that has one open end and one closed, or difficult to access end.

In the above embodiments, the tubes from which blockages may be cleared as described above are of relatively small-diameter (i.e. of internal diameter less than 5 mm), flexible, pneumatic tubing. However, in other embodiments one or more of the tubes is a different type and/or size of tube.

In the above embodiments, a T-piece, or X-connector, is connected between the pressure transducer and a piece of tubing. In other words, a T-piece or X-connector, non-return valve and filter assembly is positioned as far as possible along the length of a tube away from the open end of that tube. This tends to provide that the length of tube that may be cleared by performing the method of FIG. 4 is maximal, because the length of tubing that is cleared of tube between the T-piece, or X-connector, positioned along that tube and the open end of that tube. However, in other embodiments the T-piece or X-connector, non-return valve and filter assembly is positioned at a different position along the length of a tube. Preferably, the T-piece or X-connector, non-return valve and filter assembly is positioned proximate to a closed end of the tube.

In the above embodiments, a single T-piece or X-connector, non-return valve and filter assembly is positioned along a length of the tube. However, in other embodiments any number of such assemblies may be positioned along a tube, e.g. at different points along the length of the tube.

In the above embodiments, a filter filters air drawn into the inlet of a non-return valve. This tends to prevent further debris being drawn into the tube, or possibly being trapped inside the non-return valve. However, in other embodiments no filter is present.

In the above embodiments, the T-piece, or X-connector, the non-return valve, and the filter provide the functionalities described above with respect to FIGS. 3 and 4. However, in other embodiments, one or more of the T-piece or X-connector, non-return valve, or filter is replaced by one or more different appropriate devices that provide the same functionality/functionalities.

The invention claimed is:

1. A method for clearing a blockage in a pitot pressure line or a static pressure line of a duct of a pressure sensor, the duct comprising a first portion, the pitot or static pressure line, and a second portion, the first portion having an open end and a further end;

the open end being open to a fluid;

the further end being connected to the second portion such that the fluid is permitted to flow between the first portion and the second portion during pressure measurement;

the second portion having a first opening and a second opening, the further end being connected to the first opening, the second opening being connectable to a pressure transducer;

the method comprising the steps of:

arranging a non-return valve being connected to the first opening of the second portion such that the non-return valve is positioned at or proximate to the further end of the first portion; and upon application of a suction force to the first portion at the open end, fluid flows into the first portion via the non-return valve from outside the duct, and through the first portion from the further end to the open end;

applying a suction force to the first portion at the open end so as to remove the blockage from the first portion; and upon application of a suction force to the first portion at the open end, the non-return valve acts to reduce effects of the suction force on the pressure transducer.

2. The method according to claim 1, the method further comprising connecting a filter to an inlet of the non-return valve such that fluid allowed to flow into the duct by the non-return valve is filtered by the filter.

3. The method according to claim 1, wherein the first portion comprises a length of flexible tubing.

4. The method according to claim 1, wherein at least part of the first portion has an internal diameter of less than 5 mm.

5. The method according to claim 1, wherein the fluid is air.

6. The method according to claim 1, wherein the pressure transducer is onboard an aircraft.

7. Apparatus for clearing a blockage in a pitot pressure line or static pressure line of a duct of a pressure sensor, the apparatus comprising:

the duct having a first portion, the pitot and static pressure line and a second portion;

the first portion having an open end and a further end, the open end being open to a fluid, the further end being connected to the second portion such that the fluid is permitted to flow between the first portion and the second portion during pressure measurement;

the second portion having a first opening and a second opening, the further end of the first portion being connected to the first opening, the second opening being connectable to a pressure transducer;

a non-return valve connected to the first opening of the second portion such that the non-return valve is positioned at or proximate to the further end of the first portion, and arranged such that, upon application of a suction force to the first portion at the open end, fluid flows into the first portion via the non-return valve from outside the duct, and through the first portion from the further end to the open end;

means for applying a suction force to the first portion at the open end.

8. An aircraft comprising the apparatus of claim 7.

9. The aircraft according to claim 8, wherein the aircraft is an unmanned aircraft.

10. The aircraft according to claim 8, wherein the apparatus is housed in, mounted on, or integrated in a wing of the aircraft such that the first end is substantially flush with a surface of the wing.

11. The aircraft according to claim 8, wherein a crack pressure of the non-return valve is greater than a maximum pressure differential across the non-return valve specified for the non-return valve whilst the aircraft is in-flight.

* * * * *